Sept. 21, 1937.  R. S. WALKER  2,093,497
METHOD OF AND APPARATUS FOR TESTING MATERIALS
Filed Sept. 29, 1934   2 Sheets-Sheet 1
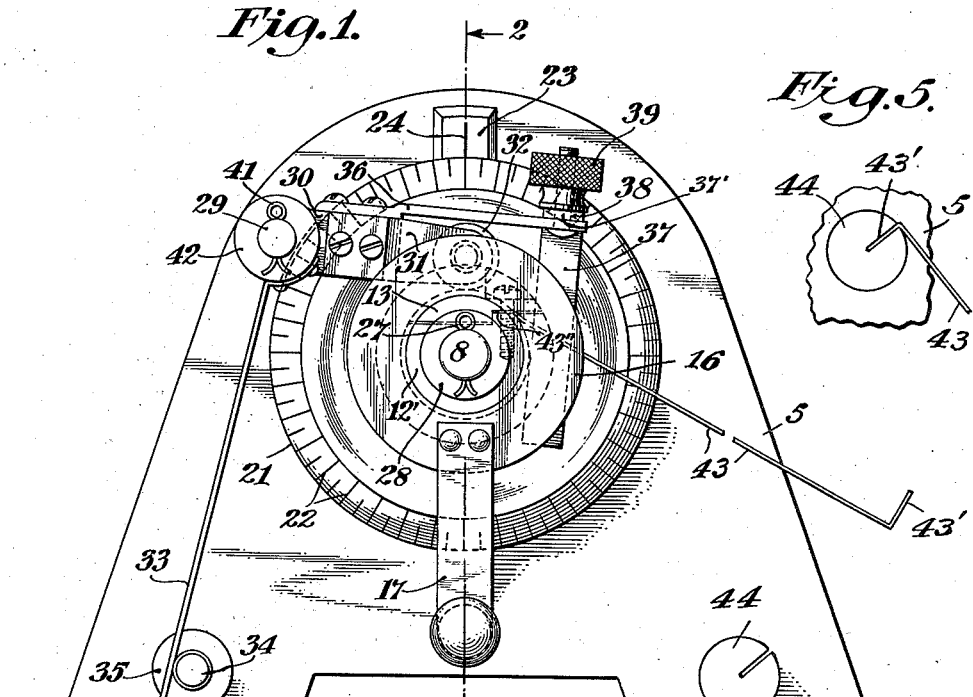
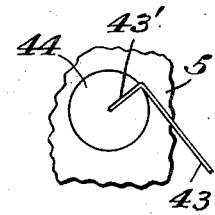
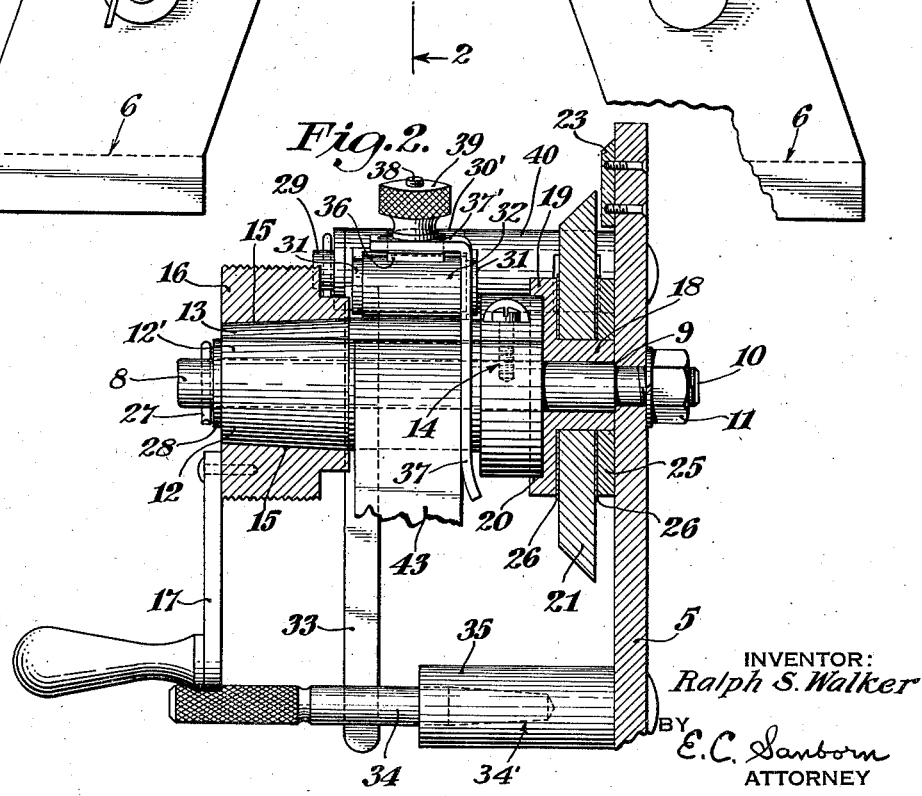
INVENTOR:
Ralph S. Walker
BY E. C. Sanborn
ATTORNEY Sept. 21, 1937.　　　R. S. WALKER　　　2,093,497
METHOD OF AND APPARATUS FOR TESTING MATERIALS
Filed Sept. 29, 1934　　2 Sheets-Sheet 2
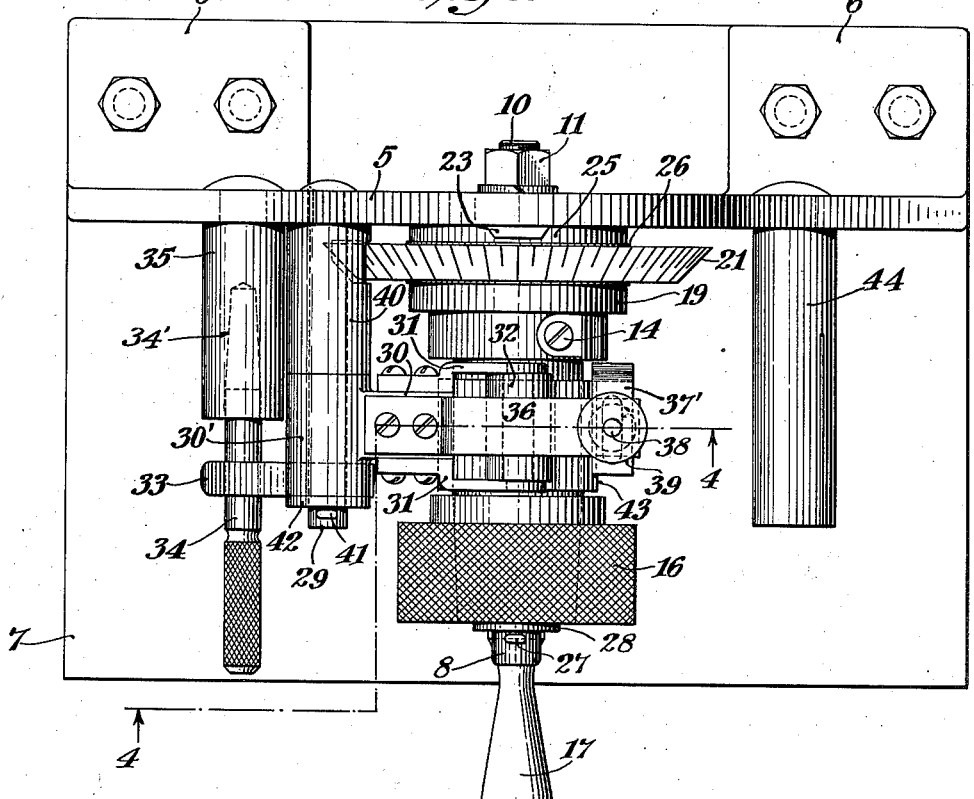
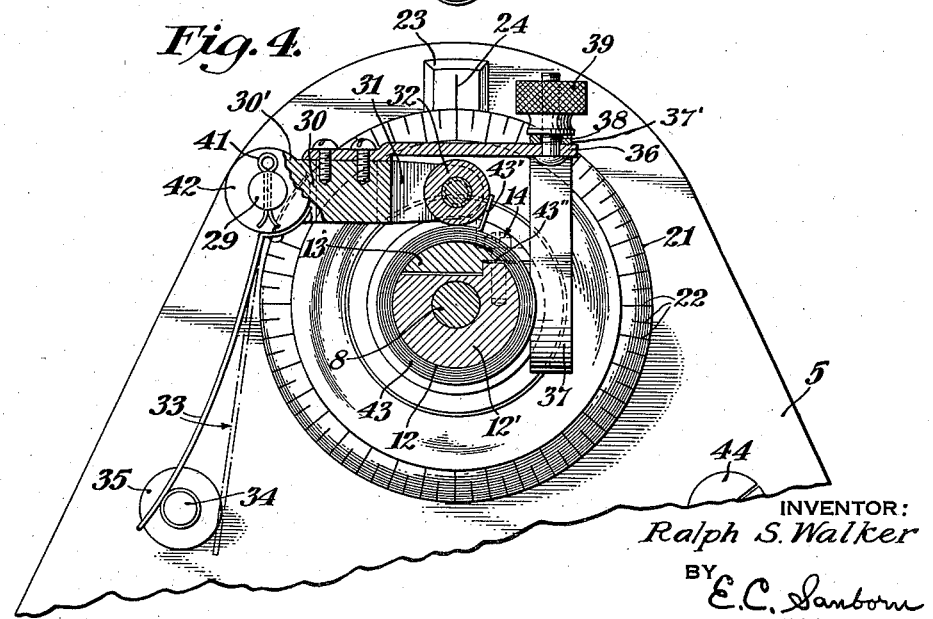
INVENTOR:
Ralph S. Walker
BY E. C. Sanborn
ATTORNEY Patented Sept. 21, 1937

2,093,497

UNITED STATES PATENT OFFICE 2,093,497

METHOD OF AND APPARATUS FOR TESTING MATERIALS

Ralph S. Walker, Indianapolis, Ind., assignor to Gold Dust Corporation, New York, N. Y., a corporation of New Jersey Application September 29, 1934, Serial No. 746,103

13 Claims. (Cl. 73—51)

This invention relates to the testing of materials and more particularly to the determination of a certain characteristic of tin plate or other metal which may be termed "resiliency". This characteristic of metals is different from that of hardness or ductility; and while it is found that in sheets of metal of the same steel analysis, for example, the characteristic which I call "resiliency" may bear a relation to ductility as arrived at by the Olsen Test, on the other hand, two sheets of metal of different steel analysis but giving approximately the same Olsen number will not necessarily have the same resiliency. So far as I am aware, no means has heretofore been provided for gauging this characteristic of metals and one of the objects of my invention is to provide a measure thereof. In this connection the invention provides for the expression of the characteristic aforesaid by the extent of the natural recoil of a coiled strip of the metal. The invention further includes the novel method of determining the "resiliency" characteristic, comprising the removal of a strip of metal from the sheet to be tested, coiling said strip tightly upon a mandrel, and measuring the natural recoil of the strip after the winding is completed. The extent of the recoil aforesaid may be measured either by the angle or degrees thru which the strip recoils, or by measurement of the increase of the inside diameter of the strip after recoil. A further object of the invention is the provision of novel means whereby the coiling of the strip and measurement of the recoil, with consequent determination of the resiliency, may be accomplished with marked facility. Other features of the invention will be hereinafter described and claimed.

In the accompanying drawings Fig. 1 is a view in side elevation, illustrating an embodiment of my novel apparatus for carrying out the method above referred to; said apparatus having inserted therein a strip of the metal for testing.

Fig. 2 is a vertical sectional view on line 2—2 of Fig. 1, with parts shown in elevation.

Fig. 3 is a plan view of said apparatus, with the strip in completely coiled position.

Fig. 4 is a view in vertical section on line 4—4 of Fig. 3, certain parts being shown in elevation.

Fig. 5 is a view of a detail.

Referring to the drawings, the apparatus which I have provided for the practice of my testing method may, as shown, comprise a suitable supporting standard 5, having horizontal, lower flanges 6, 6 which may be bolted or otherwise secured to the base 7. Mounted in said standard is the pivot bolt 8, which has a shouldered portion 9 adapted to bear against the front face of the standard 5 and a reduced end portion 10 which passes thru a hole in said standard. Said end portion 10 is threaded, as shown, for receiving a nut 11 whereby the bolt 8 is securely clamped to said standard.

Rotatably mounted on the bolt 8 is the mandrel 12. The latter comprises a lower or main body portion 12' having a hole extending longitudinally therethru for receiving the bolt 8, and an upper section or cap portion 13 removable from the lower portion 12' of the mandrel adapted to be retained thereon by a bolt or screw 14. The outer end portion of the mandrel, including both the lower section 12' and the cap portion 13, is tapered as indicated at 15 for cooperation with the tapered interior bore of a sleeve 16 which is adapted to fit snugly thereover. Upon sliding said sleeve over the mandrel into the position shown in Fig. 2, the cap 13 is clamped firmly in position. Said sleeve 16 has a handle 17 fastened thereto and may also be provided with a knurled or roughened periphery to enable the sleeve to be readily grasped for application to or withdrawal from the mandrel 12.

Also rotatably mounted on the bolt 8 between the mandrel 12 and standard 5 is a sleeve 18 having integral therewith a vertical circumferential flange 19. The latter is interiorly recessed at 20 and into this recess the adjacent end of the lower or main body portion 12' of the mandrel 12 is inserted with a press fit, so that said flange 19 and sleeve 18 rotate whenever the mandrel is rotated. Mounted on the sleeve 18 is a disk 21 having scale graduations 22 around its periphery. A plate 23 having a fixed mark 24 is secured to the standard 5 in position for cooperation with the scale on disk 21. Between the scale disk 21 and the standard 5 there is mounted on the sleeve 18 the spacing disk 25, said disk being firmly engaged with said sleeve by a press fit. Washers 26, 26 may be interposed between the opposite sides of disk 21 and the respective flange 19 and disk 25, as shown. The disk 21 is mounted between said flange 19 and disk 25 with a running fit, i. e., so that it turns with said flange and disk whenever the mandrel is rotated, but may be manually rotated with respect to said elements whenever desired.

For retaining the mandrel and associated parts in assembled relation to the bolt 8, a cotter pin 27 may be passed thru an end of said bolt adjacent the forward end of said mandrel. If desired a washer 28 may be positioned on said bolt between said cotter pin and said mandrel, as shown.

Pivotally supported on a bolt 29 mounted in the standard 5 is an arm 30, to opposite sides of which are fastened a pair of brackets 31, 31. A roller 32 is pivotally mounted in said brackets and overlies a portion of the mandrel 12 for engaging the strip of metal as the latter is wound on said mandrel. Secured to the boss 30' of said arm 30 and extending downwardly therefrom is a leaf spring 33, adapted to bear at its lower end against a pin 34 mounted in a boss 35 on said standard 5. Fastened to the top of the arm 30 is a bracket 36 which supports a downwardly extending arm 37 adapted to be engaged by one edge of the strip being tested, for guiding the same. The guide arm 37 has a portion 37' bent at right angles thereto and overlying the top of the bracket 36. A bolt 38 passes thru a hole in said bracket and thru a slot in said portion 37' of arm 37 and is engaged above said portion 37' by a nut 39. The arm 37 may thus be adjusted to any of a variety of positions depending upon the width of the strip to be tested and may be retained in adjusted position by the nut 39 and bolt 38.

The arm 30 may be maintained on the bolt 29 in properly spaced relation to the standard 5 by a bushing 40 and may be retained on said bolt by cotter pin 41 and washer 42. The pin 34 may have a tapered end 34' received in a correspondingly tapered socket in the boss 35 so as to fit firmly therein and at the same time be readily removable therefrom.

In carrying out my invention with the apparatus above described, a strip of metal 43 is first cut from the sheet of metal to be tested. The tail end 43' of this strip is then bent at right angles to the adjacent portion of the strip, which may be conveniently accomplished by inserting said end of said strip in a slot in the post 44 on the standard 5 and bending the strip against said post as illustrated in Fig. 5. The strip may then be removed from the post 44 and the forward end 43'' of said strip is placed between the lower portion 12' and cap 13 of the mandrel 12, said cap being movable vertically with respect to said lower portion, within the limits permitted by the screw 14, to accommodate metal strips of different thicknesses. The strip 43 is further so positioned that its inner edge bears against the guide arm 37. The interiorly tapered sleeve 16 is now forced over the tapered end of the mandrel 12, forcing the cap 13 toward the lower mandrel portion 12' and thereby securely clamping the strip 43 to said mandrel. The crank or handle 17 is now turned slowly counter-clockwise (as viewed in Fig. 1), the strip 43 being at the same time maintained by the operator against the guide 37, and the turning of said crank and winding of the strip is continued until the end 43' of said strip comes in contact with the pressure roller 32, as shown in Fig. 4. During the winding of the strip the roller 32 is forced firmly thereagainst due to the action of the spring 33, thus assuring that the strip is wound tightly on the mandrel. When the end 43' of the strip has been brought against roller 32, the dial 21 is turned manually with respect to the mandrel until the "zero" indication on said dial registers with the mark 24, the crank 17 meanwhile being held in the position to which it was turned to bring said end 43' against said roller. The pin 34 is now withdrawn from engagement with spring 33, permitting the latter to assume the dotted line position shown in Fig. 4, and the crank 17 is turned reversely, or clockwise, from its position aforesaid until the end 43' of the strip is just ready to leave the roller 32. The dial 21 now shows in degrees the extent of the natural recoil of said strip. The latter may be readily released from the mandrel by simply withdrawing the sleeve 16, whereupon the coiled strip may be removed from said mandrel.

The length and width of the strip tested may be arbitrarily determined, as may also the size of the mandrel on which the strip is wound; but the size of any strip under test should, of course, preferably be the same as that adopted as the standard so that the measure of the natural recoil of the strip under test, and hence its resiliency, can be compared directly with that of the standard strip. In other words, by observing the extent of the natural recoil of the strip under test, as shown by the dial 21, and comparing such recoil with that shown by dial 21 when the standard strip is tested in said apparatus, the relation of the resiliency of the first-mentioned strip to that of the standard strip is ascertained.

The determination of the resiliency of the metal thru observation of the extent of recoil, as above noted, is of particular value in ascertaining the suitability of the metal for the manufacture of metal containers, such, for example, as metallic containers for shoe polish or the like. At the same time it will be apparent that the invention is not restricted to the ascertainment of resiliency for any particular purpose.

The term "resiliency" has been employed in the foregoing description to denote the ability of metal upon release to return to its original form and shape after having been coiled.

While in the foregoing description of a specific mode of carrying out of the invention the extent of recoil is measured by the degrees or angle of recoil of the strip, said extent of recoil might alternatively be determined, as previously pointed out, by comparing the diameter of the inside of the coil after recoil with the original size of the inside of the coil when wound tightly on the mandrel.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. The method of determining a characteristic of metal which comprises tightly coiling a substantially flat strip of the metal about a mandrel, releasing one end of said strip to permit natural expansion of the coil while maintaining the general shape of the coil, and measuring the amount of natural recoil of said strip occurring upon release.

2. The method of determining a characteristic of metal which comprises tightly coiling a substantially flat strip of predetermined length of said metal about a mandrel, releasing one end of said strip sufficiently to allow the metal to slowly uncoil and to permit natural expansion thereof while maintaining the general shape of the coil, and measuring the amount of natural recoil of said strip.

3. Apparatus for determining the resiliency of materials, comprising a mandrel adapted to receive one end of a strip of said material, means for turning said mandrel to coil said strip thereon, means operable to release said strip whereby the material is allowed to recoil, and means for measuring the natural recoil thereof.

4. Apparatus for measuring the recoil of a strip of material, comprising a mandrel adapted to receive an end of said strip, means for turning said mandrel to coil said strip thereon, means for pressing said strip against said mandrel during coiling, means for releasing the pressure on said strip to enable the latter to recoil, and means for measuring the natural recoil of said strip.

5. Apparatus for measuring the recoil of a strip of material, comprising a mandrel adapted to receive an end of said strip, means for turning said mandrel in a given direction to coil said strip thereon, means for pressing said strip against said mandrel during coiling, means for releasing the pressure on said strip to enable the latter to recoil in conjunction with rotation of the mandrel in the opposite direction, and means connected to said mandrel for measuring the extent of rotation thereof in said opposite direction commensurate with the natural recoil of said strip.

6. Apparatus for measuring the recoil of a strip of material, comprising a mandrel adapted to receive an end of said strip, means for turning the mandrel in a given direction to coil said strip thereon, an abutment engaged by the opposite end of said strip when the latter is wound on said mandrel, means for pressing said strip against said mandrel during the coiling thereof, means for releasing said pressure to enable said strip to uncoil in conjunction with rotation of said mandrel in the opposite direction, and means for measuring the extent to which said mandrel is rotated in said opposite direction to the point where said opposite end of said strip is about to leave said abutment.

7. Apparatus for measuring the recoil of a strip of material, comprising a mandrel, means for securing one end of said strip to said mandrel, means for rotating said mandrel to wind said strip thereon, means cooperating with an edge of said strip to guide the latter during said winding, means pressing said strip against said mandrel during said winding, means for throwing said pressure means out of action to enable said strip to recoil, and means for measuring the extent of recoil of said strip.

8. Apparatus for measuring the recoil of a strip of material, comprising a mandrel, means for securing one end of said strip to said mandrel, means for rotating said mandrel to wind said strip thereon, a pressure element above said mandrel, a movably mounted support carrying said element, springs means acting upon said support to cause said element to press said strip against said mandrel during said winding, means for throwing said spring means out of action to enable said strip to recoil, and means for measuring the extent of recoil of said strip.

9. Apparatus for measuring the recoil of a strip of material, comprising a mandrel having relatively movable portions adapted to receive one end of said strip therebetween, said portions being tapered at one end, a sleeve having a correspondingly tapered interior bore adapted to be inserted over said portions for causing the strip to be firmly clamped therebetween, means for rotating said mandrel to wind said strip thereon, and means for measuring the extent of recoil of said strip when the latter is released.

10. Apparatus for measuring the recoil of a strip of material, comprising a mandrel, means for securing one end of said strip to said mandrel, means for rotating said mandrel to wind said strip thereon, and means comprising a dial mounted to rotate with said mandrel for indicating the extent of recoil of said strip when released.

11. Apparatus for measuring the recoil of a strip of material, comprising a mandrel, means for securing one end of said strip to said mandrel, means for rotating said mandrel to wind said strip thereon, and means comprising a dial mounted to rotate with said mandrel for indicating the extent of recoil of said strip when released, said dial being settable to zero position independently of said mandrel.

12. Apparatus for measuring the recoil of a strip of material, comprising a mandrel, means for securing one end of said strip to said mandrel, means for rotating said mandrel to wind said strip thereon, a pressure element above said mandrel, a movably mounted support carrying said element, spring means acting upon said support to cause said element to press said strip against said mandrel during said winding, means carried by said support and cooperating with an edge of said strip to guide the latter during said winding, means for throwing said spring means out of action to enable said strip to recoil, and means for measuring the extent of recoil of said strip.

13. Apparatus for measuring the recoil of a strip of material, comprising a mandrel, means for securing one end of said strip to said mandrel, an abutment, means for rotating said mandrel to wind said strip thereon until the other end engages said abutment and for enabling said mandrel to be subsequently rotated in the opposite direction accompanied by unwinding of said strip until said other end is about to be disengaged from said abutment, and means for measuring the extent of said unwinding of said strip.

RALPH S. WALKER.